(12) United States Patent
Kunz et al.

(10) Patent No.: US 8,089,971 B1
(45) Date of Patent: Jan. 3, 2012

(54) METHOD AND SYSTEM FOR TRANSMITTING FLOW CONTROL INFORMATION

(75) Inventors: James A. Kunz, Plymouth, MN (US); Ian G. Colloff, Ascot (GB); William J. Gustafson, Apply Valley, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 196 days.

(21) Appl. No.: 12/423,626

(22) Filed: Apr. 14, 2009

Related U.S. Application Data

(60) Provisional application No. 61/114,343, filed on Nov. 13, 2008.

(51) Int. Cl.
*H04L 12/28* (2006.01)
(52) U.S. Cl. ......................... 370/397; 370/235
(58) Field of Classification Search .................. 370/235, 370/389, 397, 404, 466, 468
See application file for complete search history.

(56) References Cited

U.S. PATENT DOCUMENTS

| | | | | |
|---|---|---|---|---|
| 7,233,570 B2 * | 6/2007 | Gregg | ............................ | 370/235 |
| 7,564,869 B2 * | 7/2009 | Cafiero et al. | ................. | 370/466 |
| 7,830,793 B2 * | 11/2010 | Gai et al. | ...................... | 370/230 |
| 7,876,751 B2 * | 1/2011 | Benner et al. | .................. | 370/389 |

* cited by examiner

*Primary Examiner* — Dang Ton
*Assistant Examiner* — Brian O'Conner
(74) *Attorney, Agent, or Firm* — Klein, O'Neill & Singh, LLP

(57) ABSTRACT

Method and system for network communication between a first port and second port using plurality virtual lanes provided. The method includes: (a) configuring a threshold value for each of the plurality of virtual lanes; wherein the threshold value defines an amount of data that has to be moved from a receive segment of the second port, before a flow control packet is sent by the second port to the first port; (b) setting a timer value for each of the plurality of virtual lanes; wherein a flow control packet is sent by the second port after the timer expires; (c) monitoring the amount of data removed from the receive segment of the second port; and (c) sending a flow control packet if the amount of data exceeds the threshold value or if the timer set in step (b) has expired.

21 Claims, 4 Drawing Sheets

METHOD AND SYSTEM FOR TRANSMITTING FLOW CONTROL INFORMATION

CROSS REFERENCE TO RELATED APPLICATIONS

This application claims the benefit and priority under 35 USC §119(e) of U.S. provisional application Ser. No. 61/114,343, entitled "METHOD AND SYSTEM FOR TRANSMITTING FLOW CONTROL INFORMATION", filed Nov. 13, 2008, which is incorporated herein by reference in its entirety for all purposes.

BACKGROUND

1. Technical Field

The present disclosure relates networks.

2. Related Art

Network systems are commonly used to move network information (may also be referred to interchangeably, as frames, packets or commands) between computing systems (for example, servers) or between computing systems and network devices (for example, storage systems). Various hardware and software components are used to implement network communication, including network switches.

A network switch is typically a multi-port device where each port manages a point-to-point connection between itself and an attached system. Each port can be attached to a server, input/output subsystem, bridge, hub, router, or another switch. The term network switch as used herein includes a multi-Level switch that uses plural switching elements within a single switch chassis to route data packets.

A network switch typically uses flow control to avoid overflow conditions in memory buffers that are used to store incoming packets. Based on the protocol type, for example, InfiniBand ("IB"), a flow control packet is typically sent between communicating ports. The flow control packet ensures that ports are synchronized with respect to available credit (i.e. storage space a receiving port).

In conventional systems, flow control packets are sent automatically, typically, dictated by the protocol standard. For example, IB network, a port sends a flow control packet after every 65,536 symbols. The flow control packet is sent without any regard to whether a flow control packet may actually be useful.

When a switch port sends flow control packet, it consumes a network link's available bandwidth. This can affect the overall efficiency of how quickly network packets are transmitted. Continuous efforts are being made improve the efficiency of network transmission that may be hampered by sending unnecessary flow control packets.

SUMMARY

In one embodiment, a method for network communication between a first port and a second port using a plurality of virtual lanes is provided. The method includes configuring a threshold value for each of the plurality of virtual lanes. The threshold value defines an amount of data that has to be moved from a receive segment of the second port, before a flow control packet is sent by the second port to the first port.

The method also includes setting a timer value for each of the plurality of virtual lanes. A flow control packet is sent by the second port after the timer expires.

The method further includes monitoring the amount of data removed from the receive segment of the second port; and sending a flow control packet if amount of data exceeds the threshold value or if the set timer has expired.

In another embodiment, a system for network communication is provided. The system includes a first port communicating with a second port using a plurality of virtual lanes. The first port and the second port have a receive segment to receive network information and a transmit segment for transmitting information.

A threshold value for each of the plurality of virtual lanes is configured. The threshold value defines an amount of data that has to be moved from the receive segment of the second port, before a flow control packet is sent by the second port to the first port.

A timer value is also set for each of the plurality of virtual lanes and the second port is configured to send a flow control packet when the timer for a virtual lane has expired, regardless of the configured threshold value.

The second port is also configured to monitor the amount of data that is removed from the receive segment of the second port. The second port is configured to send a flow control packet if the amount of data exceeds the threshold value or if the timer has expired.

In one embodiment, no flow control packets are sent, if the timer has not expired and the amount of data does not exceed the threshold value.

In another embodiment, different threshold values are set for the plurality of virtual lanes; and different timer values are set for the plurality of virtual lanes.

This brief summary has been provided so that the nature of the disclosure may be understood quickly. A more complete understanding of the disclosure can be obtained by reference to the following detailed description concerning the attached drawings.

BRIEF DESCRIPTION OF THE DRAWINGS

The foregoing features and other features or the present disclosure will now be described with reference to the drawings of the various embodiments. In the drawings, the same components have the same reference numerals. The illustrated embodiments are intended to illustrate, but not to limit the disclosure. The drawings include the following Figures.

DETAILED DESCRIPTION

Figure 1A:
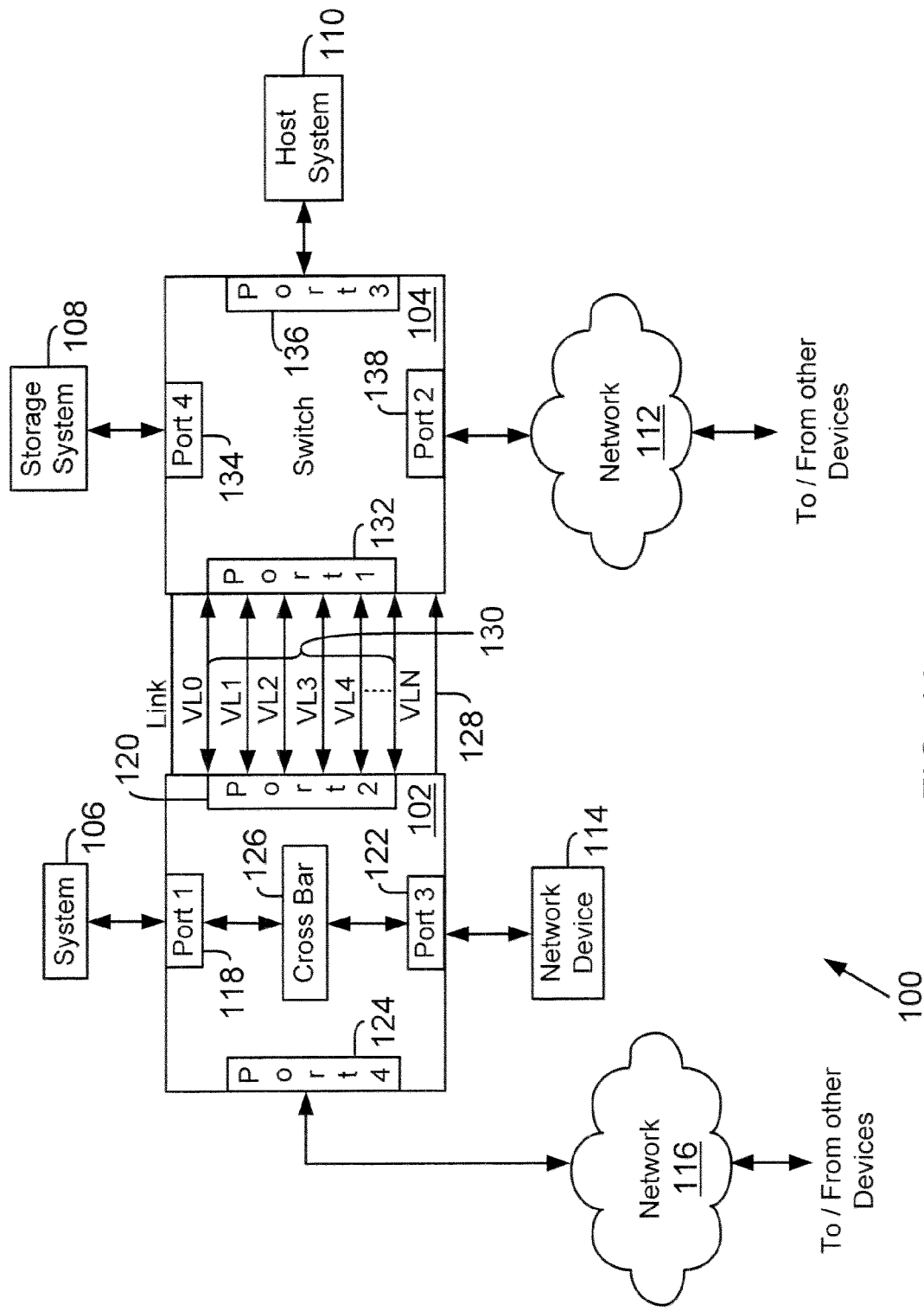
FIG. 1A shows a block diagram of a network system, according to one embodiment.

Definitions: The following definitions are provided for convenience as they are typically (but not exclusively) used in IB and general networking environment, implementing the various adaptive aspects described herein.

"Inter switch link" or "ISL": A physical link that is used for connecting two or more switches.

"Multi Level Switch": A switch that includes a plurality of switch elements operationally coupled together "Packet": A group of one or more network data word(s) used for network communication.

"Routing Table": A table that stores information for routing a packet.

"Switch": A device that facilities network communication.

"Virtual Lane" (VL): The term VL as defined by Section 3.5.7 of the IB Specification provides mechanism for creating virtual links within a single physical link. A virtual lane represents a set of transmit and receive buffers in a tort. A data VL as used to send IB packets and according to the IB Specification, configured by a subnet manager based on a Service Level field in a packet.

As a preliminary note, any of the embodiments described with reference to the figures may be implemented using software, firmware, hardware (e.g., fixed logic circuitry), manual processing, combination of these implementations. Toe term "logic" "module," "component," "system" or "functionality" as used herein generally represents software, firmware, hardware, or a combination of the elements. For instance, in the case of a software implementation, the term "logic," "module," "component," "system," or "functionality" represents program bode that performs specified tasks when executed on a processing device or devices (e.g., CPU or CPUs). The program code may be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over plural locations.

The terms "machine-readable" or the like when used, refers to any kind of medium for retaining information in any form, including various kinds of storage devices (magnetic, optical, static, etc.). The term machine-readable media also encompasses transitory forms for representing information, including various hardwired and/or wireless links for transmitting the information from one point to another.

The embodiments disclosed herein, may be implemented as a computer process (method), a computing system, or as an article of manufacture, such as a computer program product or computer readable media.

The computer program product may be a computer storage media readable by a computer device and encoding a computer program of instructions for executing a computer process. The computer program product may also be a propagated signal on a carrier readable by a computing system and encoding a computer program of in lotions for executing a computer process.

To facilitate an understanding of the various embodiments, the general architecture and operation of a network system with pact to the InfiniBand standard will be described. The specific architecture and operation of the various embodiments will then be described with reference to the general architecture of the network system.

InfiniBand ("IB") is a switched fabric interconnect standard for servers, incorporated herein by reference in its entirety. If technology is deployed server clusters/enterprise data centers ranging from two to thousands of nodes. The IB standard is published by the InfiniBand Trade Association, and is incorporated herein by reference in its entirety.

An IB switch is typically multi-port de Physical links (optical or copper) connect each port in a switch to another switch or an end device (for example, Target Channel Adapter (TCA) or a Host Channel Adapter (HCA)).

FIG. 1A shows a block diagram of a network system 100 for moving network information between various ports, according to one embodiment. System 100 includes one or more switches, for example, switches 102 and 104, operationally coupled to various other elements using various ports, for example, ports 118, 120, 122 and 124 on switch 102 and ports 132, 134, 136 and 138 on switch 104.

In one embodiment, switch 102 may be coupled to system 106, network device 114 and network 116, via ports 118, 122 and 124, respectively. Switch 104 may be operationally coupled to storage system 108, network 112 and host system 110 via ports 134, 136 and 138, respectively. In one embodiment, port 120 of switch 102 may be coupled to port 132 via a network link 128. Network link 128 may be the physical link that port may use for network communication. Network link 128 may be configured to use a plurality of virtual lanes 130 (shown as VL0 to VLn).

If each VL sends flow control packets, by simply following the IB standard, then network link 128 may become congested, and hence under utilized for sending network packets. In one embodiment, as described below, to optimize the usage of network link 128 and virtual lanes 130, flow control packets are sent systematically.

Systems 106, 108 and 110 typically include several functional components These components may include a central processing unit (CPU), main memory, input/output ("I/O") devices, and streaming storage devices (for example, tape drives). In conventional systems, the main memory is coupled to the CPU is a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

Figure 1B:
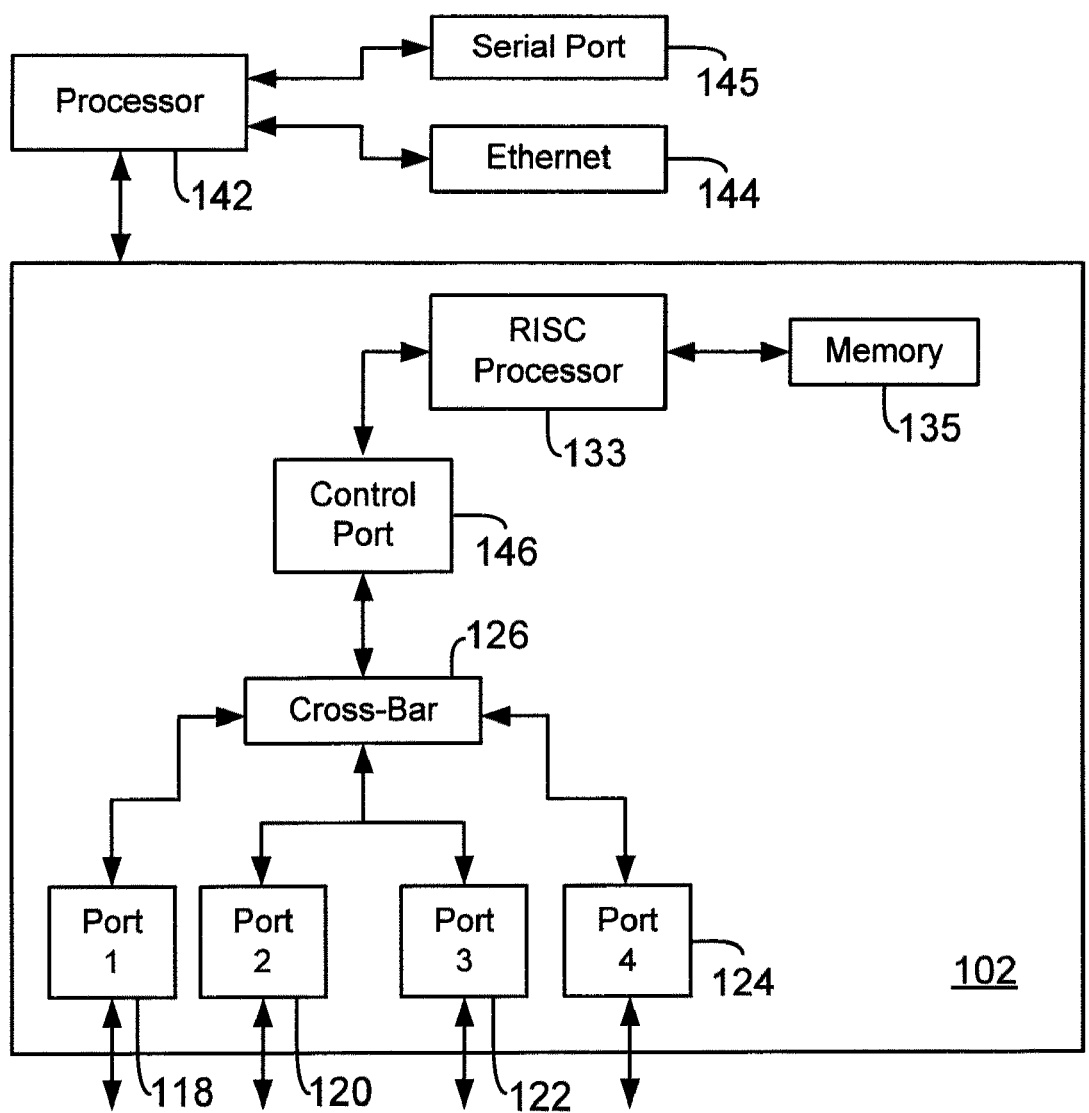
FIG. 1B shows a block diagram of a switch using the system, according to one embodiment.

FIG. 1B shows a block diagram of switch 102 that includes a processor 133, which is operationally coupled to plural ports 118, 120, 122 and 124 via a control port 146 and crossbar 126. In one embodiment, processor 133 may be a reduced instruction set computer (RISC) type microprocessor. Processor 133 executes firmware instructions out of memory 135 to control the overall operations of switch 102. Crossbar 126 is used to move information among ports 118-124. Control port 146 is used to send control information to each port.

Switch 102 may be coupled to an external processor 142 that is coupled to an Ethernet port 144 and serial port 145. In one embodiment, processor 142 may be a part of computing system 106. A network administrator may use processor 142 to configure switch 102.

Figure 1C:
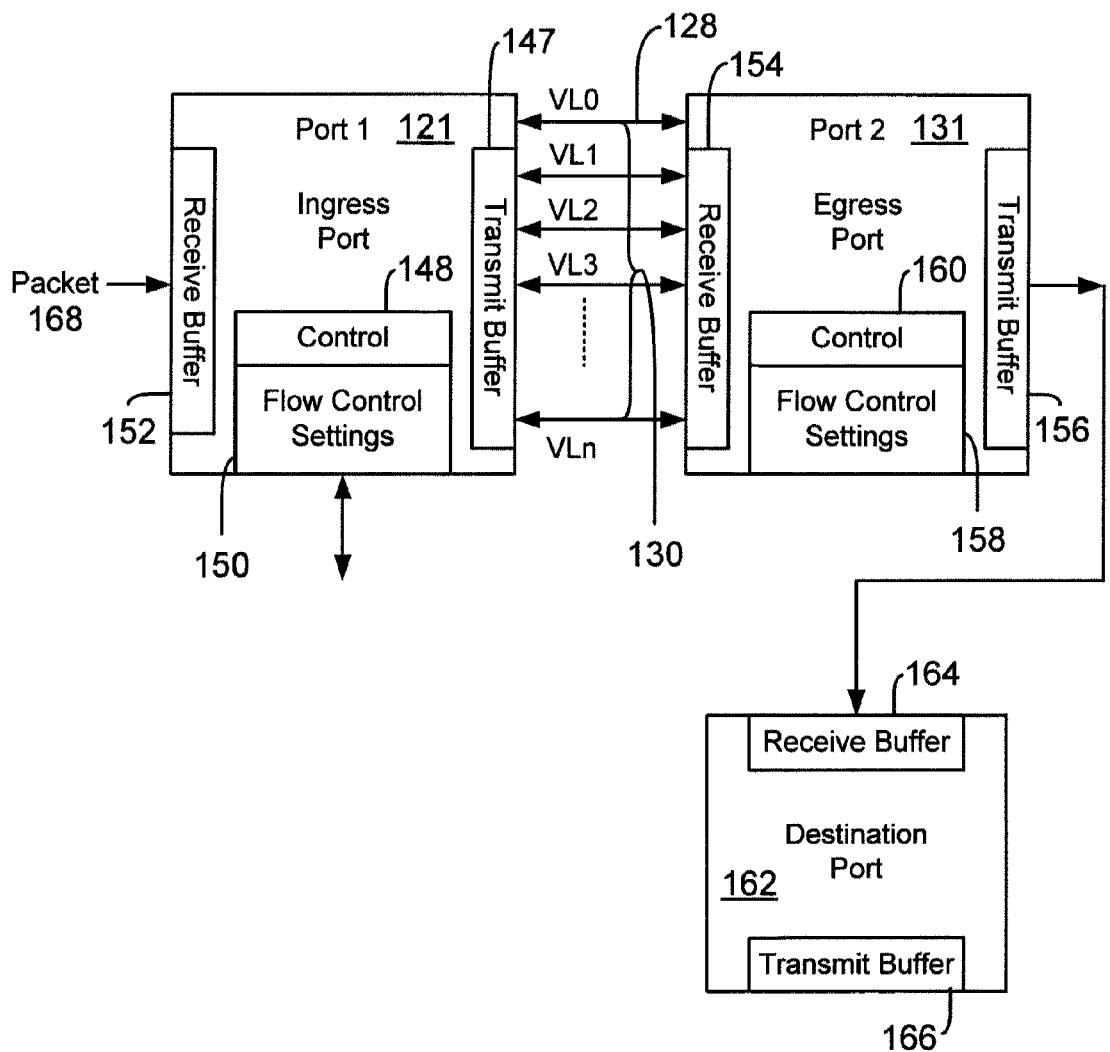
FIG. 1C shows plural ports communicating using flow control settings, according to one embodiment.

FIG. 1C shows an example of packet flow among a plurality of ports. In this example, port 121 (ingress) receives a network packet 168 and sends the network packet 168 to port 131 (egress), which sends the packet to a destination port, port 162.

Each port 121, 131 and 162 may include a receive buffer (or storage space) 152, 154 and 164, respectively, to receive and temporarily store a network packet, such as packet 168. Each port 121, 131 and 162 may also include a transmit buffer 147, 156 and 166, respectively, to temporarily store a packet before the packet is sent to its destination.

Generally, to ensure proper flow control, credit (i.e. storage space) should be available at a receive buffer before a packet is transmitted by a port. For example, before ingress port 121 sends packet 168 to egress port 131, space should be available at receive buffer 154 of egress port 131. Egress port 131 sends a flow control packet to ingress port 121 to synchronize available credit information between egress port 131 and ingress port 121. The determination of when a flow control packet should be sent is made by flow control settings in flow control setting block 150 and flow control setting block 158 in a control register, such as control registers 148 and 160.

In one embodiment, port 121, port 131 and port 162 may be a part of the same switch element. In another embodiment, the ports may be located in different switch elements.

Figure 1D:
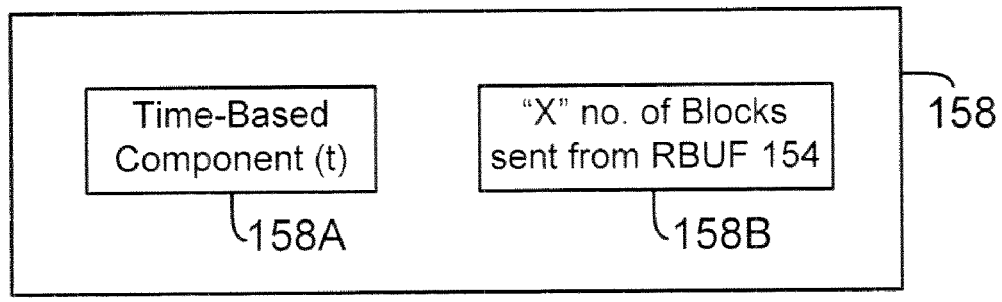
FIG. 1D shows an example of flow control packet parameters, according to one embodiment.

FIG. 1D shows an example of flow control settings 158A and 158B in flow control setting block 158 of egress port 131. In one example, flow control setting 158A includes a time-based component ("t"). This component determines when the port sends the flow packet based on a pre-programmed duration. The duration may be set based on network operating conditions and a protocol standard.

Flow control setting block 158 includes a second control setting 158B that is a component based on the number of blocks that have been moved from a receive buffer of an egress port, for example, receive buffer 154 of egress port 131. A network administrator (not shown) using a computing system (for example, 106, FIG. 1A) may set flow control settings 158A and 158B.

Figure 2:
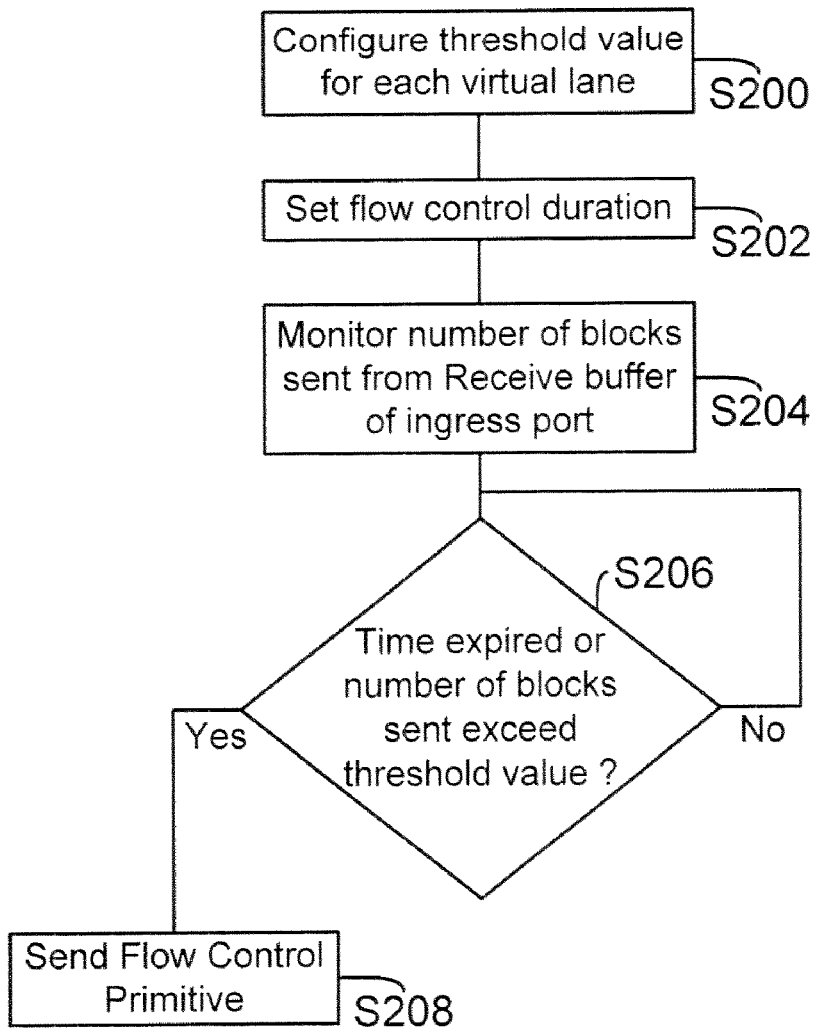
FIG. 2 shows a process flow diagram, according to one embodiment.

FIG. 2 shows a process flow diagram for sending flow control packets, according to one embodiment. The process begins in block S200, when a threshold value for each VL is set. The threshold value is the amount of information that is moved from a receive buffer, before a flow control packet is sent out. For example, control setting 158B (FIG. 1D) provides the threshold value (that is set for virtual lane VL0 of network link 128 (FIG. 1C), such that the amount of information that is moved from receive buffer 154 before a flow control packet is sent out is set for VL0. A network administrator may be able to threshold value. In one embodiment, different threshold values may be set for different virtual lanes.

In block S202, control-setting 158A, the duration "t" (FIG. 1D), is also set for a VL. A flow control packet is sent within duration "t" regardless of any other conditions, as described below. In one embodiment, different timer duration may be set for different virtual lanes. No reference to the step S204.

in block S206, a port determines if the timer (not shown) monitoring duration "t" has expired or if the number of blocks sent from the receive buffer equal or exceed the threshold value that is set in block S200. If the answer is yes, then a flow control packet is sent (block S208). If the answer at block S206 is no, then the process simply reverts back to monitoring if the duration "t" has expired and testing if the number of blocks sent from the receive buffer exceed the threshold value.

In one embodiment, flow control packets are sent based on actual network traffic rather being sent based on any fixed parameters. The threshold values for each virtual lane may vary, making the process flexible.

It is noteworthy that the foregoing embodiments may be implemented in different network types, for example, Infini-Band, Ethernet, Fibre Channel, Fibre Channel Over Ethernet (FCOE) or any other protocol type. The adaptive embodiments are not limited to any particular protocol type.

Although the present disclosure has been described with reference to specific embodiments, these embodiments are illustrative only and not limiting. Many other applications and embodiments of the present invention will be apparent in light of this disclosure and the following claims.

What is claimed is:

1. A method for network communication between a first port and a second port using a plurality of virtual lanes, comprising:
    (a) configuring a threshold value for each of the plurality of virtual lanes; wherein the threshold value defines an amount of data that has to be moved from a receive segment of the second port, before one of a plurality of flow control packets is sent by the second port to the first port; and wherein each of the flow control packets is used to synchronize available credit information between the first port and the second port;
    (b) setting a timer value for each of the plurality of virtual lanes; wherein one of the flow control packets is sent by the second port after the timer expires;
    (c) monitoring the amount of data removed from the receive segment of the second port; and
    (d) sending one of the flow control packets if the amount of data exceeds the threshold value or if the timer set in step (b) has expired.

2. The method of claim 1, wherein none of the flow control packets are sent, if the timer has not expired and the amount of data does not exceed the threshold value.

3. The method of claim 1, wherein the first port receives a network packet that is transferred to the receive segment of the second port when the second port has available space.

4. The method of claim 1, wherein the flow control packets are used between the first port and the second port to share information regarding available storage space at the second port.

5. The method of claim 1, wherein different threshold values are set for the plurality of virtual lanes.

6. The method of claim 1, wherein different timer values are set for the plurality of virtual lanes.

7. The method of claim 1, wherein the first port and the second port are network ports of a same switch element.

8. The method of claim 1, wherein the first port is a network port for a first switch element and the second port is a network port for a second switch element.

9. The method of claim 1, wherein the first port and the second port operate in an InfiniBand network.

10. The method of claim 1, wherein the first port and the second port operate in a non-Infiniband network.

11. A system for network communication, comprising:
    a first port communicating with a second port using a plurality of virtual lanes, each of the first port and the second port having a receive segment to receive network information and a transmit segment for transmitting information;
    wherein a threshold value for each of the plurality of virtual lanes is configured, the threshold value defining an amount of data that has to be moved from the receive segment of the second port, before one of a plurality of flow control packets is sent by the second port to the first port; and wherein each of the flow control packets is used to synchronize available credit information between the first port and the second port;
    wherein a timer value is set for each of the plurality of virtual lanes and the second port is configured to send one of the flow control packets when the timer for a virtual lane has expired regardless of the configured threshold value; and
    wherein the second port is configured to monitor the amount of data that is removed from the receive segment of the second port; and is configured to send one of the flow control packets if the amount of data exceeds the threshold value or if the timer has expired.

12. The system of claim 11, wherein none of the flow control packets are sent, if the timer has not expired and the amount of data does not exceed the threshold value.

13. The system of claim 11, wherein different threshold values are set for the plurality of virtual lanes.

14. The system of claim 11, wherein different timer values are set for the plurality of virtual lanes.

15. The system of claim 11, wherein the first port and the second port are network ports of a same switch element.

16. The system of claim 11, wherein the first port is a network port for a first switch element and the second port is a network port for a second switch element.

17. A system for network communication, comprising:
a first port communicating with a second port using a plurality of virtual lanes, each of the first port and the second port having a receive segment to receive network information and a transmit segment for transmitting information;
wherein a threshold value for each of the plurality of virtual lanes is configured, the threshold value defining an amount of data that has to be moved from the receive segment of the second port, before one of the flow control packets is sent by the second port to the first port; and wherein each of the flow control packets is used to synchronize available credit information between the first port and the second port;
wherein a timer value is set for each of the plurality of virtual lanes and the second port is configured to send one of the flow control packets when the timer for a virtual lane has expired regardless of the configured threshold value;
wherein the second port is configured to monitor the amount of data that is removed from the receive segment of the second port; and is configured to send one of the flow control packets if the amount of data exceeds the threshold value or if the timer has expired;
wherein none of the flow control packets are sent, if the timer has not expired and the amount of data does not exceed the threshold value; and
wherein different threshold values are set for the plurality of virtual lanes; and different timer values are set for the plurality of virtual lanes.

18. The system of claim 17, wherein the first port and the second port are network ports of a same switch element.

19. The system of claim 17, wherein the first port is a network port for a first switch element and the second port is a network port for a second switch element.

20. The system of claim 17, wherein the first port and the second port operate in an InfiniBand network.

21. The system of claim 17, wherein the first port and the second port operate in a non-InfiniBand network.

* * * * *

UNITED STATES PATENT AND TRADEMARK OFFICE
CERTIFICATE OF CORRECTION

| | | |
|---|---|---|
| PATENT NO. | : 8,089,971 B1 | |
| APPLICATION NO. | : 12/423626 | |
| DATED | : January 3, 2012 | |
| INVENTOR(S) | : James A. Kunz et al. | |

It is certified that error appears in the above-identified patent and that said Letters Patent is hereby corrected as shown below:

On the Face Page, in Assistant Examiner, in column 2, line 1, delete "Brian O'Conner" and insert -- Brian T. O'Connor --, therefor.

On the Face Page, in field (57), in Abstract, in column 2, line 2, after "and" insert -- a --.

On the Face Page, in field (57), in Abstract, in column 2, line 2, after "using" insert -- a --.

On the Face Page, in field (57), in Abstract, in column 2, line 2, after "plurality" insert -- of --.

On the Face Page, in field (57), in Abstract, in column 2, line 2, after "lanes" insert -- is --.

In column 1, line 18, after "relates" insert -- to --.

In column 1, line 29, after "server," insert -- peripheral, --.

In column 1, line 40, after "space" insert -- at --.

In column 1, line 43, before "IB" insert -- in an --.

In column 1, line 50, after "made" insert -- to --.

In column 2, line 1, after "if" insert -- the --.

In column 2, line 37, delete "or" and insert -- of --, therefor.

In column 3, line 3, after "provides" insert -- a --.

In column 3, line 5, delete "tort." and insert -- port. --, therefor.

In column 3, line 6, delete "as" and insert -- is --, therefor.

In column 3, line 12, after "processing," insert -- or a --.

In column 3, line 12, delete "Toe" and insert -- The --, therefor.

In column 3, line 18, delete "bode" and insert -- code --, therefor.

In column 3, line 32, delete ""machine-readable"" and insert -- "machine-readable media" --, therefor.

In column 3, line 48, delete "in lotions" and insert -- instructions --, therefor.

In column 3, line 52, delete "pact" and insert -- respect --, therefor.

In column 3, line 58, delete "If" and insert -- IB --, therefor.

Signed and Sealed this
Twentieth Day of March, 2012

David J. Kappos
*Director of the United States Patent and Trademark Office*

CERTIFICATE OF CORRECTION (continued)
U.S. Pat. No. 8,089,971 B1

In column 3, line 58, after "deployed" insert -- for --.

In column 3, line 62, after "typically" insert -- a --.

In column 3, line 62, delete "de" and insert -- device. --, therefor.

In column 3, line 63, after "another" insert -- IB --.

In column 4, line 23, delete "components" and insert -- components. --, therefor.

In column 4, line 27, after "CPU" delete "is" and insert -- via --, therefor.

In column 5, line 30, after "to" insert -- set the --.

In column 5, line 38, delete "in" and insert -- In --, therefor.